United States Patent
Brundisini

(12) 
(10) Patent No.: US 6,259,970 B1
(45) Date of Patent: Jul. 10, 2001

(54) ELECTRONIC INTERFACE ASSOCIABLE WITH AN ELECTRONIC CONTROL UNIT FOR AN AUTOMATIC WATERING SYSTEM FOR REMOTE CONTROLLED MANAGEMENT OF THE SYSTEM

(75) Inventor: Andrea Brundisini, Pordenone (IT)

(73) Assignee: Claber S.p.A., Fiume Veneto (IT)

( * ) Notice: Subject to any disclaimer, the term of this patent is extended or adjusted under 35 U.S.C. 154(b) by 0 days.

(21) Appl. No.: 09/150,675

(22) Filed: Sep. 10, 1998

(30) Foreign Application Priority Data

Sep. 15, 1997 (IT) ................................. MI97A2088

(51) Int. Cl.$^7$ ............................................ G05D 11/00
(52) U.S. Cl. ............................................... 700/284; 239/69
(58) Field of Search ..................... 700/11, 14–18, 700/284; 239/69, 70; 137/624.11, 624.2; 379/102.01, 102.07

(56) References Cited

U.S. PATENT DOCUMENTS

| | | | |
|---|---|---|---|
| 4,760,547 | 7/1988 | Duxbury | 700/284 |
| 4,791,658 * | 12/1988 | Simon et al. | 379/41 |
| 5,038,268 * | 8/1991 | Krause et al. | 700/16 |
| 5,651,500 * | 7/1997 | Patterson et al. | 239/69 |
| 5,740,031 * | 4/1998 | Gagnon | 700/16 |
| 5,748,466 * | 5/1998 | McGivern et al. | 700/17 |
| 5,956,248 * | 9/1999 | Williams et al. | 700/16 |
| 6,088,621 * | 7/2000 | Woytowitz et al. | 700/16 |

FOREIGN PATENT DOCUMENTS

| | | |
|---|---|---|
| 0805381 | 11/1997 | (EP) . |
| 0805381A2 | 11/1997 | (EP) . |
| 2680629 | 3/1993 | (FR) . |
| WO87/00395 | 1/1987 | (WO) . |

* cited by examiner

*Primary Examiner*—William Grant
*Assistant Examiner*—Zoila Cabrera
(74) *Attorney, Agent, or Firm*—Jacobson Holman PLLC

(57) ABSTRACT

An electronic interface associable to an electronic control unit for an automatic watering system for remote controlled management of the watering system is described. The electron unit has a plurality of output lines suitable to control a respective plurality of electro-valve lines of the watering system. The electronic interface includes a microprocessor, a connector for connecting the electronic interface with the watering system, a first interface with at least one communication channel having a remote controlled management apparatus, a second interface with a first plurality of input lines connectable with respective output lines of the control unit to control directly the electro-valves, and a first memory associated with the microprocessor in such a way that the microprocessor can detect the changes of state of the output lines of the control unit and store the changes of state in the first memory. The microprocessor can communicate the changes of state to the remote controlled management apparatus, upon request.

24 Claims, 4 Drawing Sheets

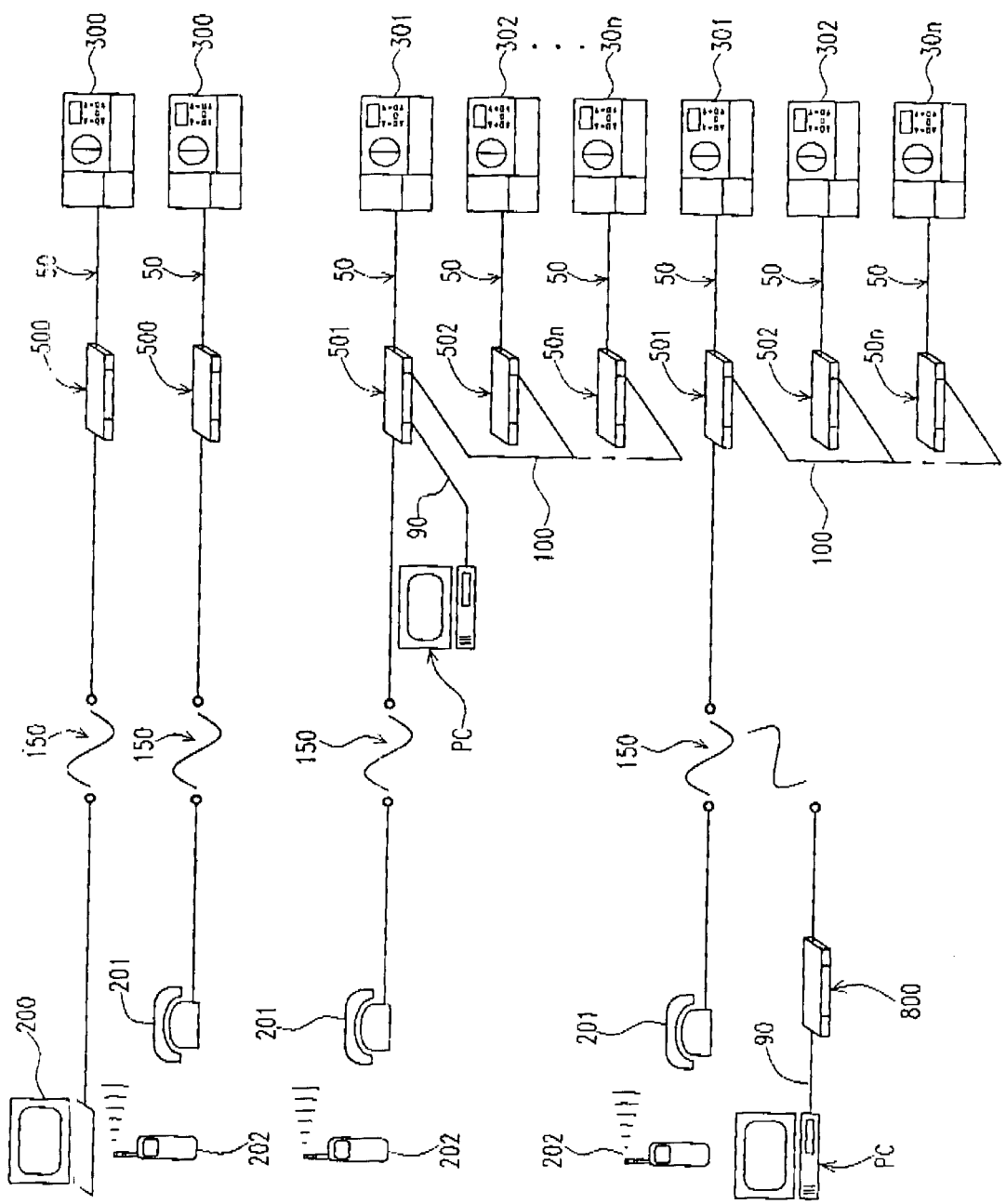

ELECTRONIC INTERFACE ASSOCIABLE WITH AN ELECTRONIC CONTROL UNIT FOR AN AUTOMATIC WATERING SYSTEM FOR REMOTE CONTROLLED MANAGEMENT OF THE SYSTEM

BACKGROUND OF THE INVENTION

Field of the Invention

The present invention refers to an electronic interface associable with an electronic control unit for an automatic watering system for remote controlled management of the system.

For the maintenance of lawns, gardens, kitchen gardens and other cultivated spaces, the employment of automatic watering systems controlled by programmable electronic control units is already widespread.

In addition, systems for remote controlled management of automatic watering systems that allow to modify the control unit programming parameters by remote control through interfaces of communication with the control units, a modem or a computer are already known.

The need to manage watering systems from a distance is felt more and more, as it allows to reduce the costs for the personnel that must carry out the maintenance. The remote controlled management of watering systems allows to employ maintenance personnel in a purposeful way only when and where it becomes really necessary.

Major producers of automatic watering systems supply the necessary equipment for this kind of control both in terms of hardware and software. However, the remote controlled management systems that each producer of automatic watering systems places on the market are not flexible, in that for a certain type of control unit it is necessary to purchase the hardware (control unit and communication interface) and the management software from the same producer of the control unit. Remote controlled management systems that are flexible and that allow the remote controlled management of a generic control unit are not known.

All this is obviously disadvantageous for the users, that are bound to purchase the equipment from one single producer, and it also creates barriers to the entry of new firms on the market.

SUMMARY OF THE INVENTION

Object of the present invention is to provide a communication interface to be associated to a programmable electronic control unit for controlling an automatic watering system, that could be interfaced to a generic electronic control unit among the ones that are and that will be available on the market in order to allow the remote controlled management of the watering system, at least from the point of view of the remote monitoring of the watering system.

According to the present invention, such object is attained by means of an electronic interface that is associable to an electronic control unit for an automatic watering system for the remote controlled management of the system, said electronic control unit having a plurality of output lines suitable to control a respective plurality of electro-valves of the watering system, the interface comprising a data processing unit microprocessor connected with first interfacing means of said processing means with at least one communication channel having a remote controlled management apparatus, characterized in that it comprises second interfacing means of said processing unit with a first plurality of input lines of the interface that are connectable with output lines of the control unit, and first memory means associated with said processing unit in such a way that said processing unit can detect the changes of state of said output lines of the control unit and memorize such changes of state in said first memory means, and can communicate them to said remote controlled management apparatus upon request.

The interface according to the present invention allows to remotely monitor a watering system controlled by a generic electronic control unit. In particular the interface allows:

to control the control unit operation; and to record the events connected with the control unit operation.

Preferably the interface comprises an interface circuit for a flow sensor for the interfacing of the processing unit with a line coming from a flow sensor of the watering system. In this way the interface is capable to control the water flow of the electro-valves managed by the control unit.

Preferably, the interface comprises an interface for data transfer to/from a control unit provided in turn with a similar interface, and memory means suitable to memorise programming parameters for the control unit, that are transmitted to the interface from the remote controlled management apparatus, and programming parameters read by the control unit that can be transmitted to the remote controlled management apparatus, upon request. In this way, for the control units that allow to do so, the interface allows the remote reprogramming of the control unit and the remote verification of the programming parameters of the control unit.

BRIEF DESCRIPTION OF THE DRAWINGS

The characteristics and the advantages of the present invention will be rendered more evident by the following detailed description of one of its possible embodiments, described as a non-limiting example in the enclosed drawings, in which:

FIG. 3A–3G show some examples of remote controlled management systems of watering systems made possible through the use of the interface according to the invention.

DESCRIPTION OF THE INVENTION

Figure 1:
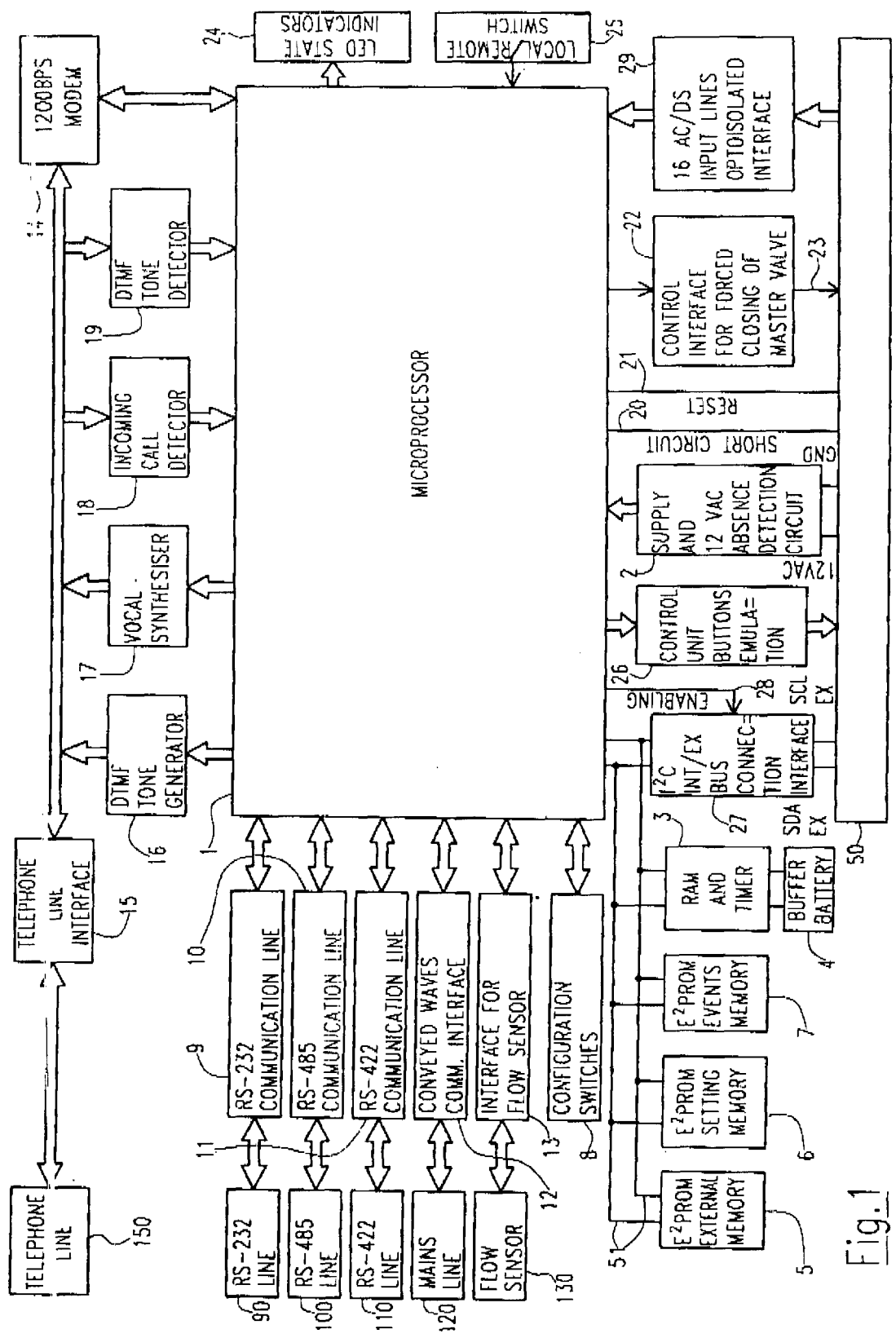
FIG. 1 is a functional block scheme of an electronic interface according to the present invention.

In FIG. 1 the functional block scheme of the electronic interface according to the present invention is shown. The interface is made of an electronic card, or of a set of electronic cards, and it comprises a microprocessor processing unit 1. The microprocessor 1 is associated with: a power supply 2 that receives a supply voltage for example of 12 VAC and a reference voltage GND from a connector 50 for connection with a programmable control unit for control of a watering system (not shown), for example a control unit of the type described in EP-A-0805381, said power supply preferably including a circuit for the detection of the absence of power supply; a RAM 3 memory incorporating also a timer function, the RAM memory 3 being associated with a buffer battery 4; a first non-volatile memory 5, preferably an EEPROM; a second non-volatile memory 6, preferably an EEPROM, to store the interface setting parameters; a third non-volatile memory 7, also preferably an EEPROM, for the memorisation of the events detected by the interface relevant the behaviour of the control unit and of the watering system being controlled. The RAM memory 3 and the non-volatile memories 5, 6, and 7 are connected with the microprocessor 1 through a serial communication bus 51 internal to the interface, for example an "IIC" bus.

The microprocessor 1 is also connected with: a set of configuration switches 8 (for example, some of the so called "DIP switch") for the configuration of the interface; a first communication interface 9 for the interfacing of the microprocessor 1 to a communication line 90 adhering to the RS-232 standard; a second communication interface 10 for the interfacing of the microprocessor 1 to a communication line 100 adhering to the RS-485 standard; a third communication interface 11 for the interfacing of the microprocessor 1 to a communication line 110 adhering to the RS-422 standard; a fourth conveyed waves communication interface 12 for the interfacing of the microprocessor 1 to a electric network line 120 (for example, a 220V line at 50 Hz) to be used as communication line according to the conveyed waves technology (Power Line Carrier); an interface 13 for the interfacing of the microprocessor 1 to an external flow sensor 130. The microprocessor 1 is also connected with a modem 14, for example a low speed modem (i.e. 1200 BPS), which is interfaced to a telephone line 150, by means of an interface of telephone line 15.

The interface for the telephone line 15 is also connected with a "DTMF" tone generator 16 and to a vocal synthesiser 17, controlled by the microprocessor 1, and to an incoming call detector 18 and a "DTMF" tones detector 19 which feed the inlets of the microprocessor 1.

From the connector 50 of connection with the processing unit, the microprocessor 1 receives a short circuit signal 20, that the control unit activates when it detects a condition of short circuit on one or more of the watering lines that it manages. Through the connector 50, the microprocessor 1 provides the electronic control unit with a reset signal 21 that is activated by the microprocessor 1 when one wants to reset the electronic control unit. The activation of the reset signal 21 can for example cause the cancellation of the control unit programming parameters.

In addition, the microprocessor 1 controls a control interface 22 for the forced closure of a main valve (master valve) of the watering system managed by the electronic control unit; through the connector 50, the interface 22 provides the control unit with a signal 23 that is activated when one wants to cause a forced closure of the watering system master valve.

In addition, the microprocessor 1 controls a circuit 26 of emulation of the buttons of the electronic control unit, that through the connector 50 provides the control unit with signals suitable to emulate the signals coming from the buttons that are normally provided in the electronic control unit for its programming.

In addition, the internal serial communication bus 51 of the interface is connected with an interfacing circuit 27 provided with an analogous serial communication bus possibly present on the electronic control unit, with which the interface circuit 27 is connected, through the connector 50, by means of two signals SDA_EX and SCL_EX. The interface circuit 27 is controlled by the microprocessor through an enable signal 28 that allows to enable the connection between the bus 51 internal to the interface and the bus provided on the electronic control unit.

The interface circuit 27 further allows through the telephone line interface 15 and the microprocessor 1 to carry out remote reprogramming of the control unit and then to transmit to distance the data relating to the new programming and the operation of the control unit. Once this has been obtained, the circuit 27 allows the control unit to disconnect itself from the remote control and to operate independently under the supervision of the interface.

In addition, the microprocessor 1 controls a set of state indicators 24 of the interface, for example consisting of LED, and it is connected with a configuration switch 25 to configure the interface according to a local or remote operation mode.

Finally, the microprocessor 1 is associated with an optoisolated interface 29 for example with sixteen input lines which receives sixteen input lines for continuous or alternate voltages from the connector 50. As an alternative, the interface 29 could be a magnetic insulation interface, or in general any one interface suitable to uncouple the input lines of the connector 50 from the inlets the of microprocessor 1.

First of all, it must be specified that, although the interface according to the present invention carries out all its functions if associated with a watering control unit provided with a connector couplable with the connector 50 (as the control unit described in the aforementioned EP-A-0805381) and having all the input and/or output lines provided in the connector 50, such interface can be anyway associated also to control units of a different type, even if equipped with connectors with a different layout or even without connectors; in this case it will be sufficient to use an adapter. The interface will not carry out all its functions, but it will anyway allow, in the worst case, to verify the behaviour of the control unit and of the watering system from distance, as well as to autonomously carry out some controls (for example, forced closing of a master valve of the watering system) when this detects situations of failure.

Figure 2:
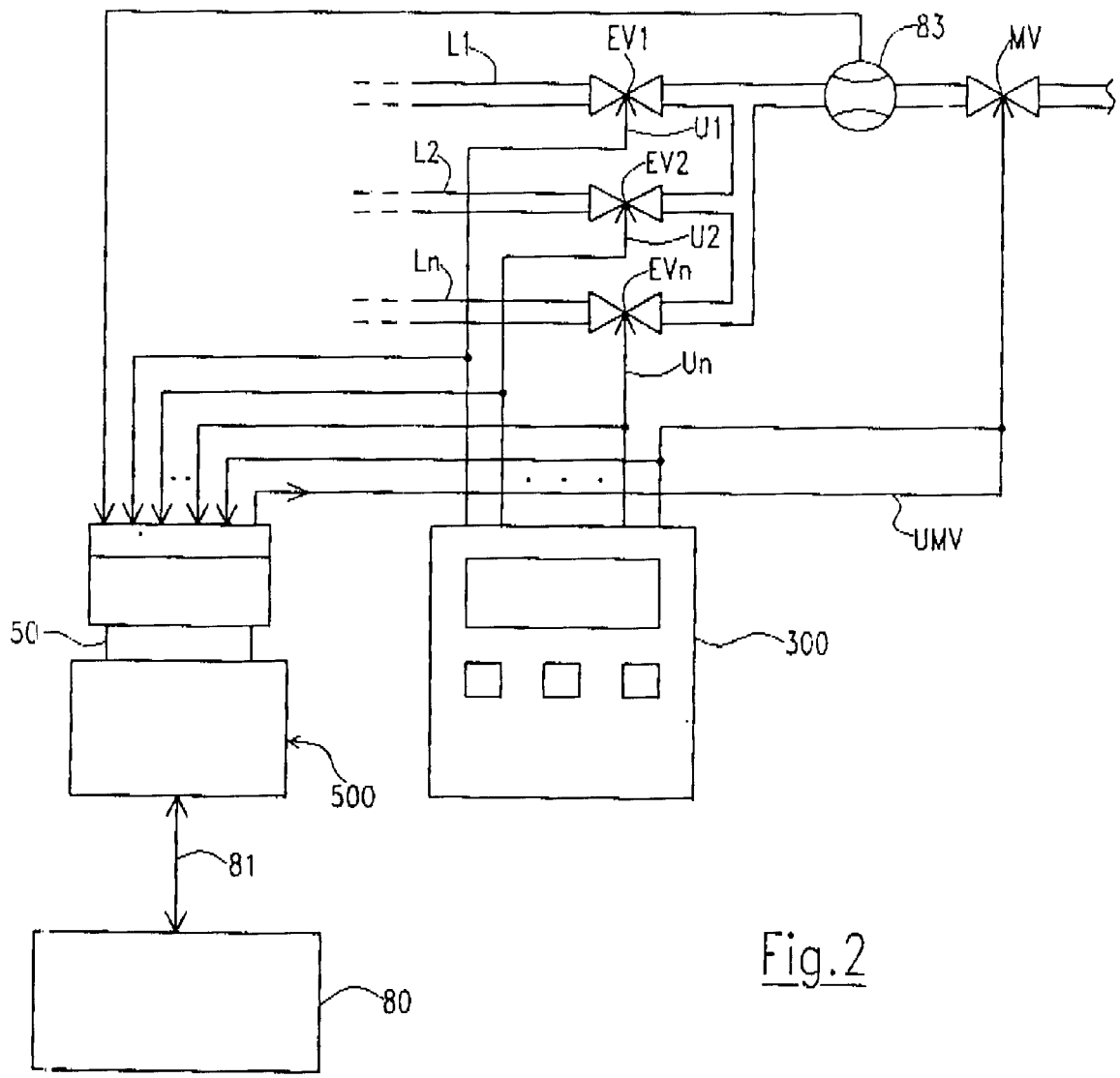
FIG. 2 shows schematically an automatic watering systems controlled by a generic electronic control unit with the interface according to the present invention associated to it.

FIG. 2 shows a simplified scheme of use of the interface 500 according to the invention in a remote controlled management system of an automatic watering system controlled by a generic electronic control unit 300. As previously mentioned, the electronic control units that are available on the market are very different among them, especially if they are manufactured by different producers. However, all electronic control units, having to control a watering system generally comprising a plurality of watering lines L1, L2, ..., Ln, have a plurality of output lines U1, U2, ..., Un for the control of respective electro-valves EV1, EV2, ..., EVn that are associated with the various watering lines. Such output lines can carry continuous voltage or alternate voltage signals according to the type of the electro-valves. In addition, a main valve or "master valve" can be provided upstream of the watering lines, in which case the control unit 300 will have an output line UMV for the control of the master valve, also in continuous or in alternate voltage. The figure schematically shows a remote controlled management board 80, for example a personal computer, a Videotel or Minitel terminal, a telephone etc., connected with the interface 500 by means of a generic communication channel 81, for example telephone line, RS-232 line, power network, ... Some examples of remote controlled management boards and of communication channels are illustrated in the following FIGS. 3A–3G.

The interface 500 according to the invention allows to acquire information about the operation of the generic control unit 300, and therefore of the watering system, even in the case of a generic control unit. Indeed, owing to the fact that the interface 500 comprises the optoisolated interface 29, it is possible to connect the microprocessor 1 of the interface 500 with a plurality of input lines (in the example described 16). These input lines, that can be either in continuous and in alternate voltage, can be connected with the output lines U1–Un and UMV of the generic control unit 300 with which the interface 500 is associated, in such a way that the microprocessor 1 can monitor the state of said lines and therefore to verify the control unit operation.

In addition, by providing a flow sensor 83 in the system, the microprocessor 1 of the interface 500 is able to monitor the quantity of water being fed by the watering system. In this way, by comparing the state of the output lines U1–Un with the datum detected by the flow sensor, the interface is capable to detect a possible situation of water leakage (failure of an electro-valve or punctured hose) or of excess or shortage of water flow as regards to the number of active watering lines. These events, detected by the interface, are memorized in the memory of events 7, as it will be explained in greater detail further on.

The external non-volatile memory 5 is used as a support memory in the transfer of the programming parameters and of the operation safety parameters of the control unit, and as a support memory for the programming parameters and of the operation safety parameters that are read by the control unit. The safety operation parameters are parameters suitable to allow the operation of the control unit even in case of blackout of the power supply; they are memorized in an non-volatile backup memory of the control unit. The programming parameters comprise the operation parameters of the control unit, typically the timing of the watering program or programs that the control unit must execute; such parameters are generally memorized in an operating RAM memory of the control unit. In case of power supply blackout, the programming parameters are lost, but once the power supply has been recovered the control unit can continue operating on the bases of the safety parameters. The external memory 5 serves as a support for the data in the transfer operations to and from the operating backup memory of the control unit.

The non-volatile setting memory 6 is destined to contain functional parameters for the operation of the interface. In such memory there are for example memorized all the parameters relating to the watering program of the control unit, that are transmitted to the interface by the remote management system, and a copy of the watering programs currently memorized in the control unit memories, that are periodically read, in order to be verified, by the interface through the connection interface 27 with the bus internal to the control unit; the timing with which the reading of the programs is done by the control unit is specified and memorized in the setting memory 6 itself, still in the setting memory 6 the values to be used as a reference for the verification, on behalf of the interface, of a condition of excess or shortage of water flow as regards the watering lines being activated is memorized. Still in the setting memory 6 the information which determines the enabling or not of the forced control of the watering system master valve on behalf of the interface, by means of the controlling interface 22 is memorised.

The setting memory 6 can also be programmed in such a way as to put alarm signals on the telephone line as a result of anamalous conditions such as absence of the mains voltage (detected by the block 2), excessive or insufficient watering (detected by the flow sensor 130), violation of the parameters of the control unit on the ground and so on.

According to the programming of the memory 6 the alarm signals can be transmitted immediately upon occurrence of the anomalies or in a second time after interrogation of the event memory 7, wherein the anomalies has meanwhile been registered.

The non-volatile memory of the events 7 is destined to contain all the information regarding the events that the interface records as having occurred on the control unit. Such memory is ideally subdivided into blocks, each one destined to the memorization of an event recorded by the interface. Each block contains an identifier of the type of event being recorded; the event can be for example the change of state of one of the output lines of the control unit that control the opening or the closing of the electro-valves of the watering lines or of the "master valve"; the change of day; the fall and the recovery of the control unit power supply; the forced closing of the master valve by the interface; the release of the master valve from the control of the control unit, if this controlled is provided; the absorption of water, detected by the interface through the flow sensor, when all the electro-valves are closed (situation indicating a water leakage condition); the activation, by the control unit, of a number of watering lines above the maximum pre-established number; the modification, operated locally and directly on the control unit, of the programming parameters of the same, memorized in its operating memory, or of the safety parameters in the backup memory; a short circuit condition detected by the control unit and signalized to the interface through the signal 20; the enabling or disabling of the control unit remote control mode, caused on the interface by operating on the switch 25; a situation of excess or shortage of water flow in consideration of the number of currently active watering lines, detected by the interface through the flow sensor and the control of the state of the control unit output lines. The memory 7 is also organized by the microprocessor 1 as a circular buffer: a block of the memory 7 is always utilized as indicator of the beginning/end of the circular buffer; each new element is memorized in this block, and the subsequent memory block becomes the new beginning/end indicator. In this way it is always possible to trace back the chronology of the events that have been recorded by the interface.

FIGS. 3A to 3G show a few examples of remote controlled management systems in which the interface according to the present invention finds an application.

In FIG. 3A, a terminal 200 of a Videotel or Minitel system is connected, through a normal switched telephone line 150, with the telephone line interface 15 of an interface 500 according to the invention, which in turn is connected, through the connector 50, with a generic electronic control unit 300 that controls a watering system (not shown). The call detector 18 is capable of detecting an incoming call on the telephone line 150 and to signalized such occurrence to the microprocessor 1. Through the modem 14 the exchange of information between the terminal 200 and the interface 500 is therefore made possible.

In FIG. 3B, a stationary telephone set 201 or a portable telephone 202 are connected, still through the switched telephone line 150, with the interface for the telephone line 15 of the interface 500, which in turn is connected, through the connector 50, with the control unit 300. Inside the interface 500, the call detector 18 is capable to detect the incoming call on the telephone line, and to signalise such occurrence to the microprocessor 1. Through the vocal synthesizer 17 the interface can send vocal messages to the user who is at the other end of the telephone line. Such messages can be menus, within which the user can operate the desirable choices by means of the pressure on a button of the telephone 201 or 202; the tone detector 19 is capable to individuate the tone corresponding to the button being pressed by the user and to control the microprocessor 1 in such a way for it to executes the corresponding operations.

In FIG. 3C, an interface 501 is still connected, through the interface for telephone line 15, with the switched telephone line 150, to the other end of which the stationary telephone set 201 or a portable telephone 202 is connected. The interface 501 is also connected with a PC personal computer, through the interface 90 for RS-232 line. The interface 501 is connected, through the connector 50, with a control unit 301 and, through the interface 10 for RS-485 line, with the corresponding interfaces 10 of a plurality of other interfaces 502 . . . 50n, each one connected with a respective control unit 302 . . . 30n through the respective connector 50. The interface 501 serves as "master", while the interfaces 502 . . . 50n serve as "slaves". The setting of the interfaces 501–50n as master or as slave is obtained by means of appropriate commutator of the block of the configuration switches 8. In a preferred embodiment, the system allows to remotely manage, through PC or telephone, up to 32 control units, that is watering systems. As an alternative, instead of the RS-485 communication line it is possible to use an RS-422 line, taking advantage of the communication lines 11 of the interfaces 501–50n. Still as an alternative, the personal computer PC can be connected with the master interface 501 through the power line, by using the conveyed waves communication interface 12.

The configuration shown in FIG. 3D is substantially identical to the previous one, with the difference that the personal computer PC, instead of being connected with the interface 501 that serves as "master through a RS-232 line, is connected with the same by means of the switched telephone line 150. To this purpose, the personal computer must be associated with a modem 800, that can also consist in the same interface according to the invention that is connected on one side with the personal computer through the RS-232 line 90, and on the other side is connected with the telephone line through the internal modem 14 and the interface for the telephone line 15.

Figures 3E, 3F, 3G:
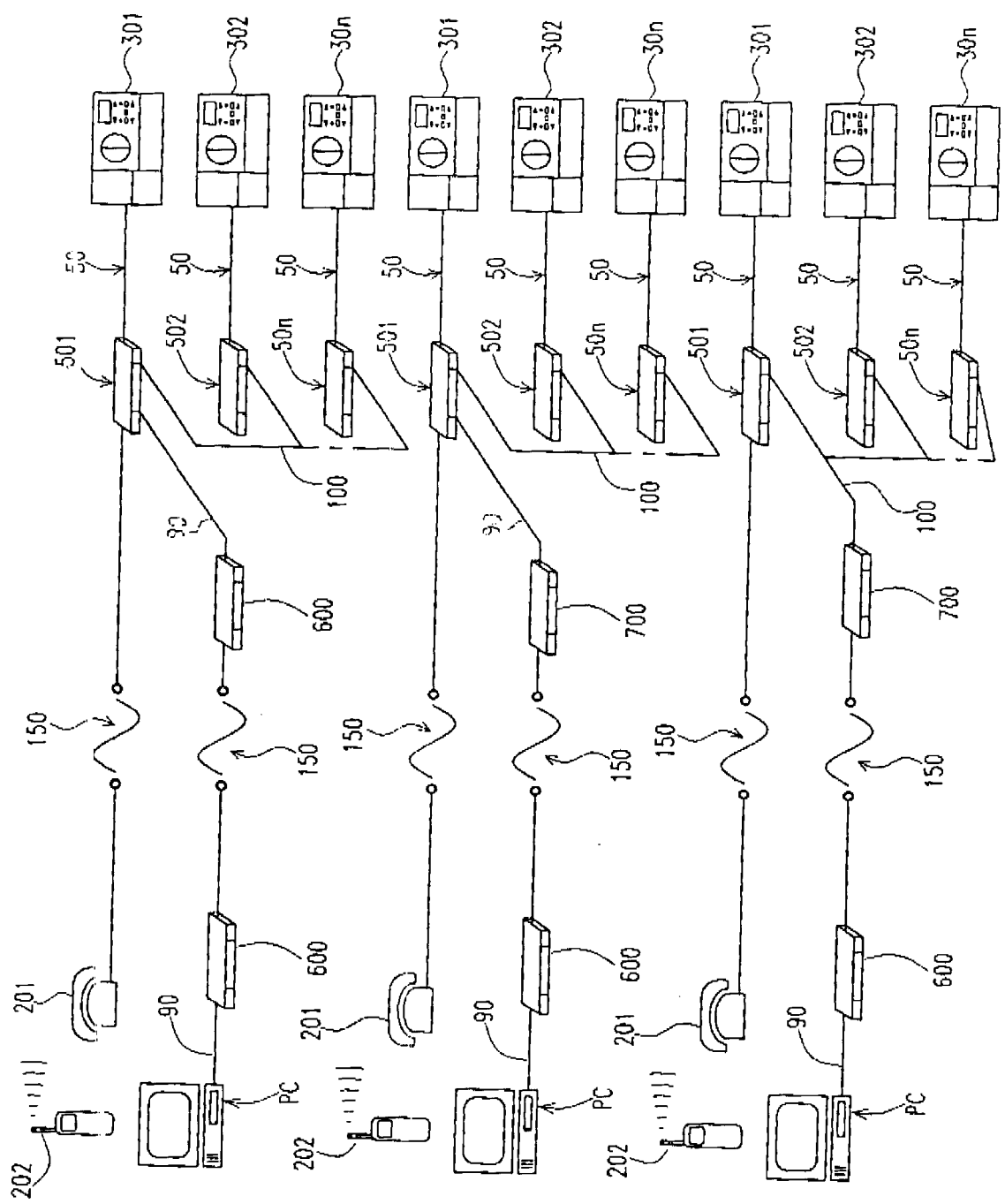

Another possible configuration, which is a variation of the one shown in the previous figure, is shown in FIG. 3E. In it, the personal computer PC is connected, through a RS-232 line 90, with a external modem 600, that communicates, through the telephone line 150, with a similar modem 600 that is connected in turn with the interface 501 through the RS-232 communication interface 9.

FIG. 3F shows a connection scheme similar to the one of FIG. 3E, in which however instead of the external modem 600 a different communication device 700, chosen among the ones available on the market, is utilised, that is suitable to be interfaced to the telephone line 150, on one side, and to the master interface 501, through a SR-232 communication line, on the other.

The scheme of FIG. 3G is a variation of the previous one, in which the communication device 700 serves as a master and it is connected, through line RS-485 or RS-422, to the interfaces 501–50n, which all serve as slaves.

It is to be noted that the above described connections 150 between the central computer and the interface can be of the radio frequency type. The same holds true for the connections 90 and 100.

Among the controls that the remote controlled management apparatus can send to the interface according to the invention there are for example a control to determine the reset of the control unit and simultaneously the zeroing of the interface memory of the events; the reset of the control unit, that the interface will execute by activating the signal 20, produces the zeroing of the memory of the same containing the programming parameters currently in use, and simultaneously it causes the transfer of the safety parameters memorized in the backup memory into the control unit operating memory. A control which causes the reset of the control unit, and at the same time the transmission to the interface of new programming parameters for the control unit, that the interface then sends to the control unit, through the communication interface 27. A control similar to the previous one, that instead will not cause the reset of the control unit. A control that determines the transfer of the safety parameters of the control unit to the interface and from this to the remote management apparatus. A control that would determine the transfer of the programming parameters contained in the operating memory of the control unit to the interface, and from this one to the remote management apparatus. A control that would determine the transfer of a determined number of memory words of the remote controlled management apparatus to the interface memory of events. A control similar to the previous one, that instead would cause the transfer of a determined number of memory words from the remote controlled management apparatus to the interface setting memory. Controls similar to the previous two, that instead would cause the transfer of data in opposite direction (from the interface to the remote management apparatus). A control which allows to program the interface, and particularly the setting memory 6, so that the same send alarms as a result of anomalous conditions; in particular, the operator can provide the interface with a telephone number to be called in case of alarm and can also indicate which alarms, between the possible ones, must cause the call. A control which allows the interface, on request of the central computer, to verify its own operation or that of the watering system in order to be able to carry out subsequently, through further controls a maintenance or a remote setting. All these controls as also others that could be necessary or useful, can for example be transmitted in a codified form as set of ASCII characters.

What is claimed is:

1. An electronic interface associable to an electronic control unit for an automatic watering system for remote controlled management of the system, said electronic control unit having a plurality of output lines suitable to control a respective plurality of electro-valve lines of the watering system, said electronic interface comprising:
   a microprocessor;
   a connector for connecting said electronic interface with said watering system;
   first interfacing means to connect said microprocessor with at least one communication channel having a remote controlled management apparatus;
   second interfacing means to connect said microprocessor through said connector with a first plurality of input lines connectable with respective output lines of said electronic control unit to control directly said electro-valves;
   a first memory means associated with said microprocessor in such a way that said microprocessor can detect the changes of state of said output lines of the control unit and store said changes of state in said first memory means and can communicate them to said remote controlled management apparatus, upon request.

2. The electronic interface according to claim 1, wherein said second interfacing means allow the interfacing of said microprocessor to output lines of said electronic control unit, which carry signals both in alternate and continuous voltage.

3. The electronic interface according to claim 2, wherein said second interfacing means allow an optoisolated interfacing between said first plurality of input lines and said microprocessor.

4. The electronic interface according to claim 3, wherein said first memory means comprise a first non-volatile memory that is electrically programmable and cancellable.

5. The electronic interface according to claim 4, wherein said first memory is structured in the form of a circular buffer of blocks, each one suitable to contain an event that is recorded by said electronic interface.

6. The electronic interface according to claim 5, wherein said each block contains an identifier of a type of an event being recorded, and data relative to the event.

7. The electronic interface according to claim 4, wherein said first interfacing means comprise an internal modulator/demodulator associated with said microprocessor, and an interface circuit for a telephone line connected with said internal modulator/demodulator, and at least one channel of communication having one telephone line.

8. The electronic interface according to claim 7, further comprising:
an incoming call detection circuit connected between said telephone line interface and said microprocessor in order to detect an incoming call on the telephone line and to signal said microprocessor of said incoming call.

9. The electronic interface according to claim 8, further comprising:
a DTMF tone detection circuit connected between said telephone line interface and said microprocessor for detecting DTMF tones on the telephone line that control said microprocessor.

10. The electronic interface according to claim 9, further comprising:
a DTMF tone generation circuit connected between said microprocessor and the telephone line interface for generating DTMF tones to be transmitted on the telephone line in response to commands coming from said microprocessor.

11. The electronic interface according to claim 10, further comprising:
a vocal synthesis circuit connected between said microprocessor and the telephone line interface for generating vocal messages to be transmitted on the telephone line in response to commands coming from said microprocessor.

12. The electronic interface according to claim 1, wherein said first interfacing means includes a RS-232 communication interface circuit that is associated with said microprocessor, and said at least one communication channel includes one RS-292 communication line.

13. The electronic interface according to claim 1, wherein said first interfacing means includes a RS-485 communication interface circuit that is associated with said microprocessor, and said at least one communication channel includes one RS-485 communication line.

14. The electronic interface according to claim 1, wherein said first interfacing means includes a RS-422 communication interface circuit that is associated with said microprocessor, and said at least one communication channel includes one RS-422 communication line.

15. The electronic interface according to claim 1, wherein said first interfacing means includes a conveyed waves communication interface circuit that is associated with said microprocessor, and said at least one communication channel includes one power of mains line.

16. The electronic interface according to claim 1, further comprising:
an interface circuit for flow sensor for interfacing said microprocessor with an input line connectable with a flow sensor of the watering system, for allowing said microprocessor a dynamic detection of a flow of water that feeds the watering system.

17. The electronic interface according to claim 1, comprising:
an interface circuit for controlling a master valve of the watering system to interface an output line of said microprocessor to an output line of said master valve of the watering system in such a way that said microprocessor can produce closing and opening of the master valve.

18. The electronic interface according to claim 1, comprising:
second memory means for storing programming parameters for the electronic control unit, that are received from said remote management apparatus of the control unit and are transferable to the control unit through a data transfer interface to/from the electronic control unit.

19. The electronic interface according to claim 18, wherein said second memory means store said programming parameters memorized by the control unit and read by the control unit through said data transfer interface.

20. The electronic interface according to claim 19, wherein said second memory means store said parameters for a personalization of an interface operation.

21. The electronic interface according to claim 18, wherein said second memory means can be programmed to generate alarm signals upon anomalous operation conditions.

22. The electronic interface according to claim 19, wherein said data transfer interface interfacing an IIC communication bus internal to an interface with an IIC communication bus internal to said control unit.

23. The electronic interface according to claim 22, further comprising:
third memory means for serving as support memory in said data transfer operations to and toward the control unit.

24. The electronic interface according to claim 1 further comprising:
configuration means associated with said microprocessor to configure the electronic interface as master or as slave in a connection of a plurality of interfaces to a same remote control management apparatus.

* * * * *